(12) United States Patent
Larmo et al.

(10) Patent No.: US 11,224,016 B2
(45) Date of Patent: Jan. 11, 2022

(54) FIRST COMMUNICATIONS DEVICE AND A METHOD THEREIN FOR HANDLING OF ACTIVE MODE OPERATION

(71) Applicant: Telefonaktiebolaget LM Ericsson (publ), Stockholm (SE)

(72) Inventors: Anna Larmo, Espoo (FI); Bo Hagerman, Jersey City, NJ (US); Håkan Persson, Solna (SE); Meng Wang, Sundbyberg (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 150 days.

(21) Appl. No.: 16/324,261

(22) PCT Filed: Sep. 26, 2016

(86) PCT No.: PCT/SE2016/050907
§ 371 (c)(1),
(2) Date: Feb. 8, 2019

(87) PCT Pub. No.: WO2018/056878
PCT Pub. Date: Mar. 29, 2018

(65) Prior Publication Data
US 2019/0182772 A1 Jun. 13, 2019

(51) Int. Cl.
*H04W 52/02* (2009.01)

(52) U.S. Cl.
CPC ... *H04W 52/0212* (2013.01); *H04W 52/0219* (2013.01); *H04W 52/0229* (2013.01); *Y02D 30/70* (2020.08)

(58) Field of Classification Search
CPC ......... H04W 52/0235; H04W 52/0209; H04W 52/0212; H04W 52/0216; H04W 52/0222; H04W 52/0225; H04W 52/0248
See application file for complete search history.

(56) References Cited

U.S. PATENT DOCUMENTS 9,237,523 B2 1/2016 Hsu et al.
2014/0112226 A1 4/2014 Jafarian et al.
(Continued)

FOREIGN PATENT DOCUMENTS

EP 2 827 657 A1 1/2015
EP 2 941 062 A1 11/2015

OTHER PUBLICATIONS

Communication pursuant to Article 94(3) EPC, EP 16 916 910.9, dated Jul. 26, 2019, 8 pages.
(Continued)

*Primary Examiner* — Asad M Nawaz
*Assistant Examiner* — Najeeb Ansari
(74) *Attorney, Agent, or Firm* — Sage Patent Group

(57) ABSTRACT

A first communications device and a method therein for handling of active mode operation after transmitting data to a second communications device. The first and the second communications devices are operating in a wireless communications network. The first communications device transmits a first data transmission to the second communications device and enters a sleep mode. At a number of points in time, the first communications device temporarily wakes up from the sleep mode to an active mode for an active mode period. Further, the first communications device indicates, to the second communications device, a point of time of the active mode period.

22 Claims, 4 Drawing Sheets

(56) References Cited

U.S. PATENT DOCUMENTS

| | | | |
|---|---|---|---|
| 2014/0016101 A1 | 6/2014 | Merlin et al. | |
| 2014/0321350 A1* | 10/2014 | Kneckt | H04W 76/28 |
| | | | 370/311 |
| 2015/0245291 A1 | 8/2015 | Lee et al. | |
| 2015/0358800 A1* | 12/2015 | Park | H04W 8/005 |
| | | | 370/311 |
| 2016/0105829 A1* | 4/2016 | Wentink | H04W 8/005 |
| | | | 370/338 |
| 2016/0021951 A1 | 7/2016 | Asterjadhi | |
| 2016/0212702 A1* | 7/2016 | Ghosh | H04W 52/0216 |
| 2016/0353435 A1* | 12/2016 | Ghosh | H04W 74/002 |
| 2017/0111858 A1* | 4/2017 | Azizi | H04W 52/0212 |
| 2017/0195954 A1* | 7/2017 | Ghosh | H04W 52/0216 |
| 2017/0367118 A1* | 12/2017 | Choi | H04W 74/0816 |
| 2018/0020501 A1* | 1/2018 | Aboul-Magd | H04W 52/0206 |
| 2018/0049240 A1* | 2/2018 | Kim | H04W 84/12 |
| 2018/0167882 A1* | 6/2018 | Choi | H04W 72/121 |
| 2018/0220366 A1* | 8/2018 | Bergstrom | H04W 76/28 |
| 2018/0220367 A1* | 8/2018 | Sundman | H04W 52/0216 |
| 2018/0279362 A1* | 9/2018 | Choi | H04W 74/04 |

OTHER PUBLICATIONS

Supplementary European Search Report for European Patent Application EP 16 91 6910, dated Jul. 17, 2019, 4 Pages.

International Search Report and Written Opinion of the International Searching Authority, PCT/SE2016/050907, dated May 5, 2017, 14 pages.

* cited by examiner

Figure 5 Method performed by the first communications device 402

FIRST COMMUNICATIONS DEVICE AND A METHOD THEREIN FOR HANDLING OF ACTIVE MODE OPERATION

CROSS REFERENCE TO RELATED APPLICATIONS

This application is a 35 U.S.C. § 371 national stage application of PCT International Application No. PCT/SE2016/050907 filed on Sep. 26, 2016, the disclosure and content of which is incorporated by reference herein in its entirety.

TECHNICAL FIELD

Embodiments herein relate generally to a first communications device and to a method therein. In particular, embodiments herein relate to handling of active mode operation in a wireless communications network.

BACKGROUND

Communications devices such as terminals are also known as e.g. User Equipments (UEs), mobile terminals, stations (STAs), wireless devices, wireless communications devices, wireless terminals and/or mobile stations. Terminals are enabled to communicate wirelessly in a wireless communications network, such as a Wireless Local Area Network (WLAN) or a cellular communications network sometimes also referred to as a cellular radio system or cellular networks. The communication may be performed e.g. between two terminals, between a terminal and a regular telephone and/or between a terminal and a server via an access network and possibly one or more core networks, comprised within the wireless communications network.

The above communications devices may further be referred to as mobile telephones, cellular telephones, laptops, tablets or sensors with wireless capability, just to mention some further examples. The communications devices in the present context may be, for example, portable, pocket-storable, hand-held, wall-mounted, computer-comprised, or vehicle-mounted mobile devices. The communications devices are enabled to communicate voice and/or data, via an access network, such as a Radio Access Network (RAN), with another entity, such as e.g. an Access Point (AP), another communications device or a server.

The communications network covers an area, e.g. a geographical area, which is divided into subareas, such as coverage areas, cells or clusters. In a cellular communications network each cell area is served by an access node such as a base station, e.g. a Radio Base Station (RBS), which sometimes may be referred to as e.g. eNodeB (eNB), NodeB, B node, or Base Transceiver Station (BTS), depending on the technology and terminology used. The base stations may be of different classes such as e.g. macro eNodeB, home eNodeB, micro eNode B or pico base station, based on transmission power, functional capabilities and thereby also cell size. A cell is the area where radio coverage is provided by the base station at a base station site. One base station, situated on the base station site, may serve one or several cells. Further, each base station may support one or several communication technologies. The base stations communicate over the air interface operating on radio frequencies with the communications devices within range of the base stations. In the context of this disclosure, the expression Downlink (DL) is used for the transmission path from the base station to the communications device. The expression Uplink (UL) is used for the transmission path in the opposite direction i.e. from the communications device to the base station.

A Universal Mobile Telecommunications System (UMTS) is a third generation (3G) telecommunication network, which evolved from the second generation (2G) Global System for Mobile Communications (GSM). The UMTS terrestrial radio access network (UTRAN) is essentially a RAN using wideband code division multiple access (WCDMA) and/or High Speed Packet Access (HSPA) for user equipment. In a forum known as the Third Generation Partnership Project (3GPP), telecommunications suppliers propose and agree upon standards for third generation networks, and investigate enhanced data rate and radio capacity. In some RANs, e.g. as in UMTS, several radio network nodes may be connected, e.g., by landlines or microwave, to a controller node, such as a radio network controller (RNC) or a base station controller (BSC), which supervises and coordinates various activities of the plural radio network nodes connected thereto. This type of connection is sometimes referred to as a backhaul connection. The RNCs and BSCs are typically connected to one or more core networks.

Specifications for the Evolved Packet System (EPS), also called a Fourth Generation (4G) network, have been completed within the 3rd Generation Partnership Project (3GPP) and this work continues in the coming 3GPP releases, for example to specify a Fifth Generation (5G) network. The EPS comprises the Evolved Universal Terrestrial Radio Access Network (E-UTRAN), also known as the Long Term Evolution (LTE) radio access network, and the Evolved Packet Core (EPC), also known as System Architecture Evolution (SAE) core network. E-UTRAN/LTE is a variant of a 3GPP radio access network wherein the radio network nodes are directly connected to the EPC core network rather than to RNCs. In general, in E-UTRAN/LTE the functions of an RNC are distributed between the radio network nodes, e.g. eNodeBs in LTE, and the core network. As such, the RAN of an EPS has an essentially "flat" architecture comprising radio network nodes connected directly to one or more core networks, i.e. they are not connected to RNCs. To compensate for that, the E-UTRAN specification defines a direct interface between the radio network nodes, this interface being denoted the X2 interface.

Multi-antenna techniques can significantly increase the data rates and reliability of a wireless communication system. The performance is in particular improved if both the transmitter and the receiver are equipped with multiple antennas, which results in a Multiple-Input Multiple-Output (MIMO) communication channel. Such systems and/or related techniques are commonly referred to as MIMO systems.

A Wireless Local Area Network (WLAN) is a wireless communications network that links two or more communications devices using a wireless distribution method, such as spread-spectrum or OFDM radio, within a limited area such as a home, school, computer laboratory, or office building. This gives users the ability to move around within a local coverage area and yet still be connected to the communications network. A WLAN can also provide a connection to the wider Internet.

Most modern WLANs are based on the Institute of Electrical and Electronics Engineers (IEEE) 802.11 standards and are marketed under the Wi-Fi brand name.

The IEEE 802.11 is a set of Media Access Control (MAC) and Physical layer (PHY) specifications for implementing WLAN communication in the 900 MHz and 2.4, 3.6, 5, and 60 GHz frequency bands. They are created and maintained by the IEEE LAN/MAN Standards Committee (IEEE 802).

In the future, many communications devices, e.g. Internet of Things (loT) devices, are expected to run on battery and thus require power conservation schemes from the wireless communications network they are operating in. Most power conservation schemes, such as the Discontinuous Reception (DRX) in the 3GPP wireless systems such as 3G and 4G, as well as the power save mode in Wi-Fi with Traffic Indication Map (TIM), may be used to define when the IoT device is reachable, or more generally, how to reach the IoT device. To configure these mechanisms in an optimal way, the traffic characteristics need to be understood.

Application characteristics, and higher layer protocols, e.g. the protocols above the Internet Protocol (IP), used, define how often the end device, e.g. the IoT device, needs to be reachable for successful communication. For example, with an application transmitting only seldom and a protocol stack based on the User Datagram Protocol (UDP) and the Constrained Application Protocol (CoAP), the IoT device does not need to be reachable often, unless actuation is performed.

However, when a Transmission Control Protocol (TCP) based stack is used in the same scenario, with an application layer protocol such as the Message Queue Telemetry Transport (MQTT), the IoT device needs to be more responsive for the TCP to work properly, as the TCP expects a bi-directional link to confirm delivery of data.

Delivery of a single packet over the TCP and the UDP is schematically illustrated in FIG. 1. FIG. 1 shows how a connection set up is done for the TCP through a three way handshake. The TCP three-way handshake starts with the initiating party sending a synchronization "SYN" message, to which the receiving party answers with a synchronization acknowledgement "SYN-ACK" thus acknowledging the reception of the SYN and sending its own SYN in return. Finally, the initiating party answers with ACK and DATA, which may be sent together. Reception of data is then confirmed with an ACK in the reverse link, i.e. from the receiving party to the initiating party.

To optimize the procedure for high bitrates, the TCP also typically implements delayed ACKs, where the ACK response to data is not sent immediately, but a period of time, e.g. 200 milliseconds in many implementations, is used to wait for more data before replying with an ACK.

Communication in Downlink (DL)

When a TCP connection is initiated in the DL, i.e. from an access point to a communications device, the communications device, e.g. the IoT device, needs to be regularly available for the TCP connection to even start and after that be available for new data as long as it is expected. The current sleeping mechanisms such as DRX and TIM are mainly designed to solve the problem of initial availability. FIG. 2 schematically illustrates communications in the downlink from a cloud comprising a clod node to a device such as an STA, using the TCP protocol. In FIG. 2, the upper part is referred to as cloud but it could also be referred to as a server, and the lower part referred to as a device/STA in FIG. 2 could also be referred to as a Client. As depicted in the FIG. 2, in order to optimize the sleeping, the system should be aware of the TCP Round Trip Time (RTT). The RTT is the length of time it takes for a signal to be sent plus the length of time it takes for an acknowledgment of that signal to be received. In other words, in order to optimise the sleeping of the device, e.g. the STA that has entered sleep mode after transmission, such as after transmission of the SYN-ACK in FIG. 2, should know the TCP RTT in order to wake up in right time to be able to receive the ACK+Data transmitted in the DL.

Communication in the Uplink (UL)

When a TCP connection is initiated in the UL, the communications device, e.g. the IoT device, needs to regularly be available for TCP acknowledgements, e.g. ACKs, after each UL transmission. The 4G connected mode DRX has several parameters and timers available to tune the IoT device's behaviour for this case. Examples of already existing parameters are the inactivity timer which defines how long the receiver is kept open after an UL transmission, and the DRX short cycle which gives a shorter regular cycle for a period of time after UL activity. FIG. 3 schematically illustrates communications in the uplink using the TCP protocol. As illustrated, also for UL communication the TCP RTT should be known to the device in order for the device to wake up to receive the SYN-ACK and the ACK transmitted in the DL after the device has entered sleep mode after the respective transmission of the Data and the ACK-Data in the UL.

A common drawback with existing solutions is that the TCP RTT is typically not known in the beginning of the connection. Therefore, optimization of the sleep period, e.g. optimization of the length of the sleep period, is not possible. For example, if the communications device in FIG. 2 enters sleep mode after the transmission of the UL SYN-ACK or if the communications device in FIG. 3 enters sleep mode after the transmission of the UL Data, the communications device will not have knowledge about the TCP RTT, and thus the device does not have knowledge of when to expect a response in the DL. Since the communications device will not have knowledge about when to expect the response in the DL, the communications device will not know when to wake up from a sleep mode that it entered after transmission of the UL SYN-ACK or the UL Data.

In 4G LTE, the solution is to introduce an inactivity timer and a DRX short cycle parameter that will be used after the communications device has been active in order to stay more responsive in case more data follows. However, recent agreements in 3GPP RAN2 denote that the DRX short cycle parameter is not used for narrow band communications devices, e.g. Narrow Band IoT (NB-IoT) devices. By the expression "narrow band communications device" when used in this disclosure is to be understood to refer to communications device configured to operate within a narrow frequency band, such as within 180 kHz. Another solution would be to configure the communications device with a long enough inactivity timer which basically means keeping the communications device awake over the expected RTT plus the possible delayed ACK timer value used at the cloud or server side.

In Wi-Fi, no mechanism exists to optimize sleep cycle for response in the DL. The wake-up schemes for DL responses rely mostly on the regular TIM.

Thus, in order to make the communications device available for data coming as a response to an earlier sent UL packet, the basic cycle needs to be configured short, which is consuming resources from a power resources perspective, e.g. a battery perspective, or the communications device needs to be configured to stay awake over the expected RTT, also consuming power resources.

Some possible solutions are described in the reference U.S. Pat. No. 9,237,523 to Hsu et al. U.S. Pat. No. 9,237,523 discloses a method of establishing a sleep mode operation between a mobile station and its serving base station in a wireless communications system. When sleep mode operation is active, the MS enters into a series of sleep cycle and each sleep cycle comprises a listening window followed by a sleep window. In one aspect, each sleep cycle is associated with a set of sleep cycle parameters including a Sleep Cycle Length and an adjustable Listening Window Length. Each set of sleep cycle parameters is determined based on a predefined traffic characteristic of a data communication flow between the MS and it serving BS. Different embodiments of sleep cycle parameters are provided for real-time traffic, non-real-time traffic, real-time and non-real-time mixed traffic, and multi-rate transmission traffic.

A drawback with the method disclosed in U.S. Pat. No. 9,237,523 is that the disclosed method requires determining a predefined traffic characteristic before applying optimized sleep cycle parameters.

SUMMARY

An object of embodiments herein is to address at least some of the above-mentioned drawbacks among others and to improve the performance in a wireless communications network.

According to one aspect of embodiments herein, the object is achieved by a method performed by a first communications device for handling of active mode operation after transmitting data to a second communications device. The first communications device and the second communications device are operating in a wireless communications network.

The first communications device transmits a first data transmission to the second communications device and enters a sleep mode.

At a number of points in time, the first communications device temporarily wakes up from the sleep mode to an active mode for a respective active mode period.

The first communications device indicates to the second communications device, a point of time of the respective active mode period.

According to another aspect of embodiments herein, the object is achieved by a first communications device for handling of active mode operation after transmitting data to a second communications device. The first communications device and the second communications device are configured to operate in a wireless communications network.

The first communications device is configured to transmit a first data transmission to the second communications device and to enter a sleep mode.

The first communications device is configured to, at a number of points in time, temporarily wake up from the sleep mode to an active mode for a respective active mode period.

Further, the first communications device is configured to indicate to the second communications device, a point of time of the respective active mode period.

According to another aspect of embodiments herein, the object is achieved by a computer program, comprising instructions which, when executed on at least one processor, causes the at least one processor to carry out the method performed by the first communications device.

According to another aspect of embodiments herein, the object is achieved by a carrier comprising the computer program, wherein the carrier is one of an electronic signal, an optical signal, a radio signal or a computer readable storage medium.

Since the first communications device indicates to the second communications device, a point of time of the respective active mode period, the handling of the first communications device's active mode operation is optimised or at least improved, and correspondingly also the handling of the sleep mode operation, and at the same time ensuring that the second communications device has knowledge about the point of time of the respective active mode period so it may transmit transmission to the first communications device during its active mode period. Thereby the utilization of power resources may be optimised or at least improved. This results in an improved performance in the wireless communications network.

An advantage with embodiments herein is that they provide handling of active mode operation without needing to know the round trip time for bi-directional communication, e.g. without needing to determine the traffic pattern, which a prior art communications device needs to know in order to stay awake to receive a response to a transmission it has made.

A further advantage with embodiments herein is that they enable a simple scheme for making a sleepy device, e.g. the first communications device entering the sleep mode, available for DL data after an UL oriented transmission to better account for bi-directional reliable communication protocols that may be used above the MAC layer of the radio communication.

A yet further advantage with embodiments herein is that even if the first communications device is configured with a long sleeping cycle or that is always asleep by default, it will still be responsive in case bi-directional communication is needed due to, e.g., the use of TCP on the transport layer. The reason for this is that the first communications device has indicated to the second communications device, the point of time of the respective active mode period. This enables optimized energy conservation while still maintaining reliable and fast data delivery. A first communications device that is always asleep may be a sensor designed to only transmit a transmission but occasionally may need to receive a transmission.

BRIEF DESCRIPTION OF DRAWINGS

Examples of embodiments herein are described in more detail with reference to attached drawings in which.

DETAILED DESCRIPTION

In order to facilitate understanding of embodiments herein, some problems with the state of the art communications networks will first be identified and discussed.

As mentioned above, a common drawback with existing solutions is that the round trip time for bi-directional communication, e.g. the TCP RTT, is typically not known in the beginning of the connection. Therefore, optimization of the sleep period, e.g. optimization of the length of the sleep period, is not possible, since it is not known when in time the communications device is to expect a response to a transmitted transmission, and thus it is not known when the communications device is to wake up if it has entered a sleep mode after the transmission.

An object addressed by embodiments herein is therefore how to improve performance in a wireless communications network.

Therefore, as mentioned above, according to embodiments herein, a way of improving the performance in the wireless communications network is provided.

Note that although terminology from WLAN is used in this disclosure to exemplify the embodiments herein, this should not be seen as limiting the scope of the embodiments herein to only the aforementioned system. Other wireless systems, such as for example a Low Rate Wireless Personal Access Network (LR-WPAN) as defined in e.g. IEEE 802.15.4, a Bluetooth network, a 5G network, an LTE network, a Wideband Code Division Multiple Access (WCDMA) network, a Global System for Mobile Communications (GSM) network, any 3GPP cellular network, Worldwide Interoperability for Microwave Access (WiMAX) network, a SIGFOX network, a Zigbee network, and a Bluetooth Low Energy (BLE) network may also benefit from exploiting the ideas covered within this disclosure.

In this section, the embodiments herein will be illustrated in more detail by a number of exemplary embodiments. It should be noted that these embodiments are not mutually exclusive. Components from one embodiment may be assumed to be present in another embodiment and it will be obvious to a person skilled in the art how those components may be used in the other exemplary embodiments.

Figure 1:
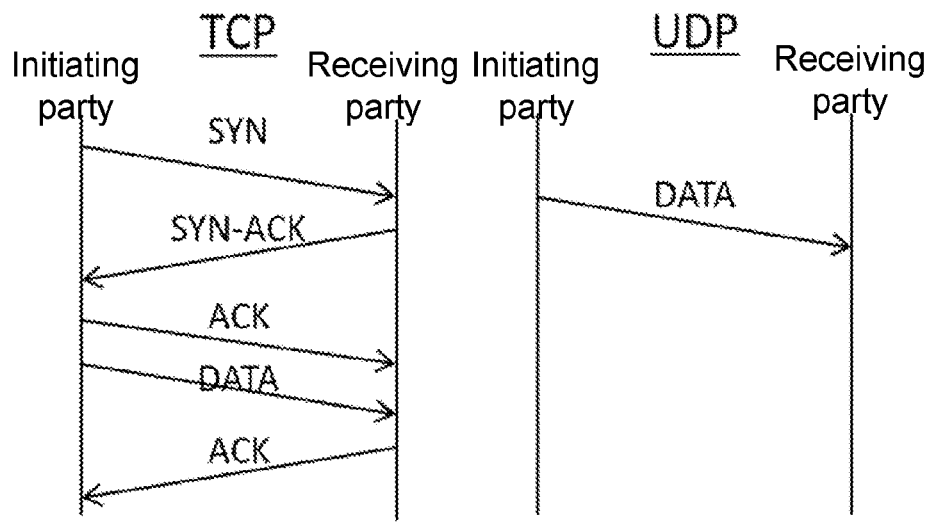
FIG. 1 is a schematic combined flowchart and signalling scheme illustrating delivery of a single packet over the TCP and the UDP, respectively.
Figure 2:
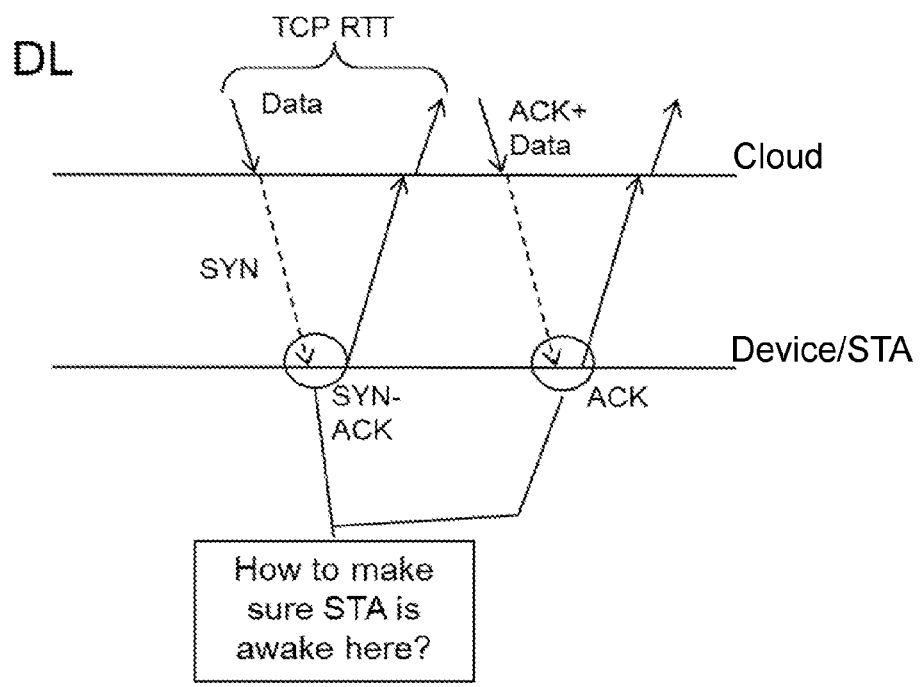
FIG. 2 schematically illustrates communications in the downlink using the TCP protocol.
Figure 3:
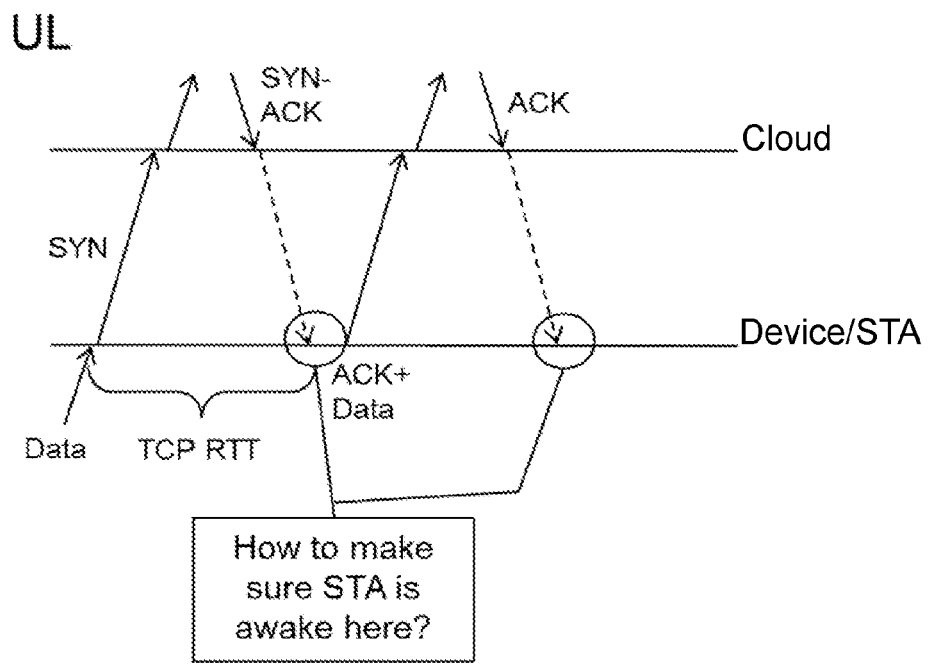
FIG. 3 schematically illustrates communications in the uplink using the TCP protocol.
Figure 4:
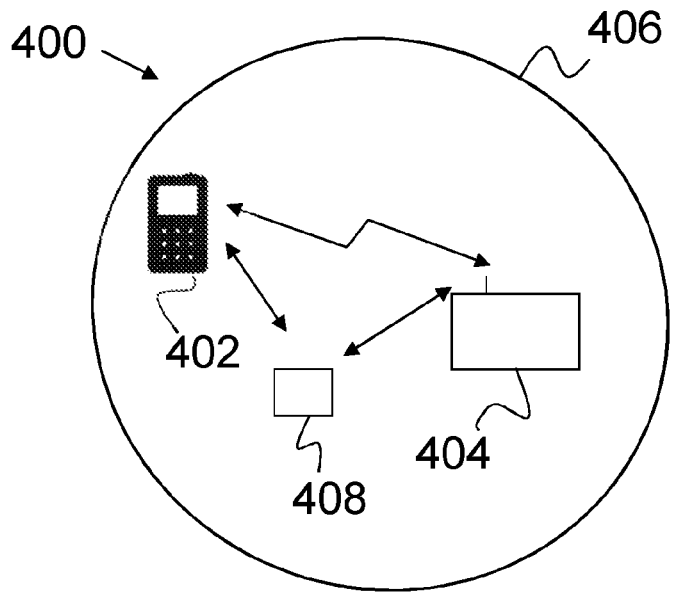
FIG. 4 is a schematic block diagram schematically illustrating embodiments of a wireless communications network.

Embodiments herein relate to a wireless communications network 400 as schematically illustrated in FIG. 4. For example, embodiments herein may be implemented in the wireless communications network 400. The wireless communications network 400 may be a short range communications network, such as a WLAN, a LR-WPAN or a Bluetooth network, or a cellular communications network such as a 5G network, an LTE network, a Wideband Code Division Multiple Access (WCDMA) network, a Global System for Mobile Communications (GSM) network, any 3GPP cellular network, Worldwide Interoperability for Microwave Access (WiMAX) network, a SIGFOX network, a Zigbee network, a BLE network or a combination of one or more of the aforementioned communications networks just to mention some examples.

A first communications device 402 operates in the wireless communications network 400. Thus, the first communications device 402 is configured to operate in the wireless communications network 400. Further, the first communications device 402 may be comprised in the wireless communications network 400. The first communications device 402 may be a wireless communications device such as an Internet of Thing (IoT) device, a Long Range Low Power (LRLP) device, a User Equipment (UE), or another node capable of transmitting data to a receiving node.

In some embodiments disclosed herein, the non-limiting term first User Equipment (UE) is used and it refers to any type of a first communications device communicating with a second communications device in a communications network. Examples of first communications devices are wireless devices, target devices, device to device UEs, machine type UEs or UEs capable of machine to machine communication, Personal Digital Assistants (PDA), iPADs, Tablets, mobile terminals, Mobile Stations (MSs), stations (STAs), smart phones, Laptop Embedded Equipped (LEE), Laptop Mounted Equipment (LME), USB dongles, relay nodes, mesh nodes etc.

In this disclosure the terms first communications device, first wireless device and first UE may be used interchangeably. Further, it should be noted that the term UE used in this disclosure also covers other communications devices such as Machine Type of Communication (MTC) device, an Internet of Things (IoT) device, e.g. a Cellular IoT (CIoT) device. Please note the term user equipment used in this document also covers other wireless devices such as Machine to Machine (M2M) devices, even though they do not have any user.

A second communications device 404 operates in the wireless communications network 400. Thus, the second communications device 404 is configured to operate in the wireless communications network 400. Further, the second communications device 404 may be comprised in the wireless communications network 400. The second communications device 404 may be a wireless communications device such as an Internet of Thing (IoT) device, a Long Range Low Power (LRLP) device, a User Equipment (UE), or another node capable of receiving data from a transmitting node.

In some embodiments disclosed herein, the non-limiting term second User Equipment (UE) is used and it refers to any type of a second communications device communicating with a first communications device, e.g. the second communications device 404, in a communications network. Examples of second communications devices are wireless devices, target devices, device to device UEs, machine type UEs or UEs capable of machine to machine communication, Personal Digital Assistants (PDA), iPADs, Tablets, mobile terminals, smart phones, Laptop Embedded Equipped (LEE), Laptop Mounted Equipment (LME), USB dongles, mesh nodes etc.

In this disclosure the terms second communications device, second wireless device and second UE may be used interchangeably. Further, it should be noted that the term UE used in this disclosure also covers other communications devices such as Machine Type of Communication (MTC) device, an Internet of Things (IoT) device, e.g. a Cellular IoT (CIoT) device. Please note the term user equipment used in this document also covers other wireless devices such as Machine to Machine (M2M) devices, even though they do not have any user.

Furthermore, the second communications device 404 may be a Radio Network Node (RNN) e.g. a radio access node such as a radio base station, for example a Base Station (BS), an eNodeB, also denoted eNB, a Home eNodeB, or a NodeB or any other network node capable to serve the first communications device 402 when located within a first area 406, e.g. a first geographical area, in a communications network, such as the communications network 400. In this disclosure, the first area 406 is sometimes referred to as a first coverage area, a first cell or a first cluster wherein the second communications device 404 may provide radio coverage. Herein, this is also specified as the second communications device 404 may manage or may be configured to manage communication with the first communications device 402 in the first area 406. Sometimes in this disclosure this is also referred to as the second communications device 404 is associated with the first communications device 402 when it is located and/or operates within the first area 406.

Thus, the terms first area 406, first coverage area 406, first cell 406 and first cluster 406 may be used interchangeably.

Other examples of the second communications device 404 are Multi-Standard Radio (MSR) nodes such as MSR BS, network controllers, Radio Network Controllers (RNCs), Base Station Controllers (BSCs), relays, donor nodes controlling relay, Base Transceiver Stations (BTSs), Access Points (APs), transmission points, transmission nodes, Remote Radio Units (RRUs), Remote Radio Heads (RRHs), nodes in Distributed Antenna System (DAS) etc.

A wake up unit 408, sometimes herein referred to as a wake up receiving device 408, operates in the wireless communications network 400. Thus, the wake up receiving device 408 is configured to operate in the wireless communications network 400. Further, the wake up receiving device 408 may be comprised in the wireless communications network 400.

The wake up receiving device 408 may be a so called Wake Up Receiver (WUR) configured to transmit a wake up signal to another device operating in the communications network 400, e.g. to the first communications device 402.

In some embodiments, the wake up receiving device 408 is comprised in the first communications device 402. In such embodiments, the wake up receiving device 408 may be a low power receiver that is awake, e.g. in active mode, for long periods of time, e.g. longer period of times than a main receiver of the first communications device 402, and configured to wake up the main receiver of the first communications device 402 only when needed, e.g. only when the first communications device 402 needs to receive a transmission. When the wake up receiving device 408 is comprised in the first communications device 402 it may be referred to as a wake up receiving module 408 and it may be a low power receiving module. In such embodiments the main receiver may be a receiving module as will be described below with reference to FIG. 6.

Figure 5:
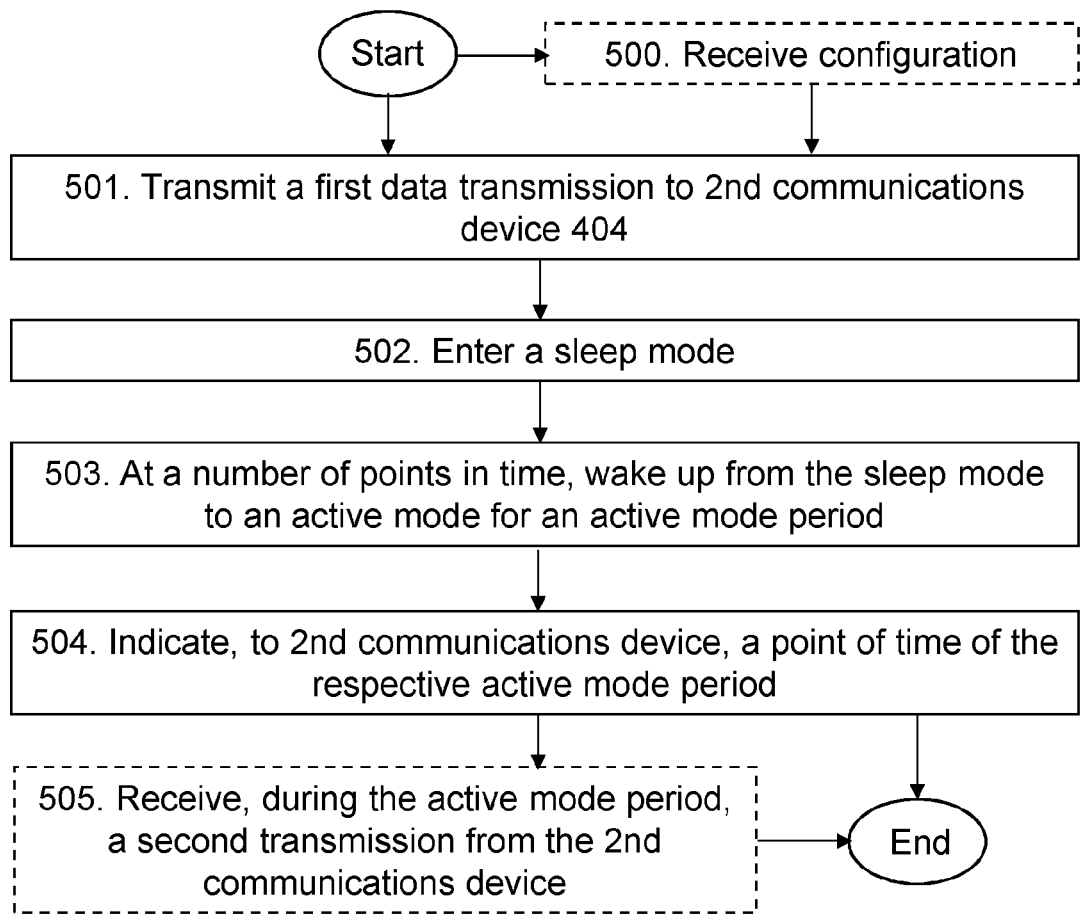
FIG. 5 is a flowchart schematically illustrating embodiments of a method performed by a first communications device.

Examples of methods performed by the first communications device 402 for handling of active mode operation will now be described with reference to the flowchart depicted in FIG. 5. As previously mentioned, the first communications device 402 and the second communications device 404 are operating in the wireless communications network 400.

Further, as also previously mentioned, in some embodiments the first communications device 402 may be a MS, a STA, a UE, a relay node, or a first mesh node and the second communications device 404 may be an RNN, a BS, an AP, or a second mesh node just to mention some examples.

The methods comprise one or more of the following actions. It should be understood that the actions may be taken in any suitable order and that some actions may be combined. Actions that are optional are presented in dashed boxes in FIG. 5.

Action 500

In some embodiments, the first communications device 402 receives a configuration from the second communications device 404.

The configuration may relate to the active mode operation and to active mode periods. For example, the configuration may relate to when the first communications device 402 is to wake up after an uplink transmission to check for possible downlink data.

Thus, in some embodiments, the first communications device 402 is configured, e.g. pre-configured, by the second communications device 404.

Action 501

The first communications device 402 transmits a first data transmission to the second communications device 404. The first data transmission may be any kind of transmission, such as a synchronisation message, a synchronization acknowledgment message, a data transmission relating to one or more sensing or measuring operations performed by the first communications device 402, etc. just to mention some examples.

The first communications device 402 is in an active mode when transmitting, e.g. during transmission of, the first data transmission. Further, the first data transmission may be sent using any higher layer protocol, e.g. any protocol from a layer above the IP layer.

In some embodiments, the first communications device 402 transmits the first data transmission using a Medium Access Control (MAC) layer.

The MAC layer is the lower sublayer of the data link layer layer 2 of the seven-layer OSI model. The MAC sublayer provides addressing and channel access control mechanisms that make it possible for several communications devices, e.g. the first and second communications devices 402, 404, to communicate within a wireless communications network, such as the wireless communications network 400.

In some embodiments, the first data transmission comprises an indication of a point of time of an active mode period, as will be described below in e.g. Action 504.

Action 502

After transmission of the first data transmission, the first communications device 402 enters a sleep mode. Thereby, resources, such as power resources and radio resources, may be saved during the sleep mode. The expression sleep mode refers to an inactive mode during which the first communications device 402 is inactive and uses a reduced amount of resources as compared to the case when the first communications device 402 is in an active mode. In some embodiments, wherein the first communications device 402 comprises the wake up receiving device 408 in addition to a main receiver, the expression sleep mode refers to an inactive mode of the main receiver.

In some embodiments, the first communications device 402 enters the sleep mode until another first data transmission is to be transmitted from the first communications device 402 to the second communications device 404. The other first data transmission may be using any higher layer protocol, e.g. any protocol from a layer above the IP layer. Further, the first communications device 402 may transmit the other first data transmission using MAC layer.

Alternatively or additionally, the first communications device 402 may enter the sleep mode until a predetermined period of time has lapsed. The predetermined period of time may be a period of time determined before the first communications device 402 enters the sleep mode. The first communications device 402 may be preconfigured with the predetermined period of time or the first communications device 402 may itself determine the predetermined period of time.

Alternatively or additionally, the first communications device 402 may enter the sleep mode until reception of a wake up signal from the wake up receiving device 408. Thus, the first communications device 402, e.g. its main receiver, may be in the sleep mode until it is awaken by reception of the wake up signal.

Action 503

At a number of points in time, the first communications device 402 temporarily wakes up from the sleep mode to an active mode for a respective active mode period. Thus, at one or more different points in time, the first communications device 402 temporarily wakes up from the sleep mode to the active mode in order to be able to a receive a respective possible transmission from the second communications device 404 during the respective active mode period. Since the first communications device 402 temporarily wakes up from the sleep mode to the active mode, the first communications device 402 re-enters the sleep mode when the active mode period has expired.

The active mode period is a time period during which the first communications device 402 is in active mode. Thus, the active mode period may also be referred to as an active mode period of time or an active mode time period.

When in active mode during the active mode period, the first communications device 402 is able to receive one or more transmissions transmitted from another network node, e.g. from the second communications device 404, to the first communications device 402. In sleep mode the first communications device 402 is not able to receive such one or more transmissions.

It should be understood that the number of points of time may be one or more points in time. Thus, the first communications device 402 wakes up from the sleep mode at least once.

Further, in some embodiments, the time period of the active mode period is variable between a minimum value and a maximum value. Thus, the time period of the active mode period may vary between a minimum value and a maximum value. For example, the minimum value may be a few microseconds and the maximum value may be several hundreds of milliseconds. Thus, the length of one or more active mode periods may be varied and two active mode periods may not have to be of the same length in time.

In some embodiments, a time interval between the start of two consecutive active mode periods is exponentially increased. For example, assume that the first communications device 402 during one period of sleep mode temporarily wakes up ten times to an active mode for an active mode period. Then, the time interval between two consecutive active mode periods out of the ten active mode periods may increase exponentially from a first time interval between the first and second active mode periods to a ninth time interval between the ninth and tenth active mode periods. This may be advantageous in some scenarios wherein the first communications device 402 expects to receive transmissions increasingly rare as time goes by.

For example, after sending the first data transmission, e.g. an UL packet, and after entering the sleep mode as described in Action 502, the first communications device 402 may wake up for a possible response with an interval that may be exponentially increased in time a chosen number of times. After the last wake-up, the first communications device 402 may go to sleep and wake up when it's time for the next UL transmission. Alternatively, after the last wake up, the first communications device 402 may, in case it is configured with a basic wake up cycle, revert back to that cycle.

Action 504

In order to inform the second communications device 404 of its active mode period, the first communications device 402 indicates, to the second communications device 404, a point of time of the respective active mode period. The respective point of time of the respective active mode period may be a respective starting point of time of the respective active mode period. By informing the second communications device 404 about the respective point of time of the respective active mode period, the second communications device 404 may transmit its one or more transmissions to the first communications device 402 during one or more points of time when it knows the first communications device 402 is in active mode. The one or more transmissions from the second communications device 404 may be one or more second data transmissions as will be described below in Action 504.

In some embodiments, the first communications device 402 indicates a suggestion of a point of time of the active mode period to the second communications device 404. In response to such indicated suggestion, the second communications device 404 may agree or not agree with the suggested point of time. If the second communications device 404 does not agree with the suggested point of time, it may suggest another point of time for the active mode period to the first communications device 402. Thus, the indication of the point of time of the active mode period may sometimes involve a negotiation of the point of time between the first and second communications devices 402, 404.

In some embodiments, the first communications device 402 may indicate the point of time of the active mode period when transmitting the first data transmission to the second communications device 404 as described in Action 501 above. The indication of the point of time of the active mode period may comprise an expected point of time for the start of the active mode period or a point of time indicated by a configuration. The latter point of time may be referred to a preconfigured point of time of the active mode period. The expected point of time may be a point of time expected by the first communications device 402. Further, it should be understood that the indication may comprise one or more indications of one or more active mode periods.

The first communications device 402 may indicate the point of time of the active mode period after waking up from the sleep mode to the active mode. Thus, in some embodiments, the first communications device 402 firstly wakes up from the sleep mode to the active mode for the active mode period, and secondly, indicates the point of time of the active mode period to the second communications device 404. The point of time indicated may be the point of time of a next upcoming active mode period.

The first communications device 402 may indicate the point of time of the active mode period by, during the active mode period, transmitting a signal to the second communications device 404, which signal informs the second communications device 404 about the first communications device 402 being in the active mode. The signal transmitted to the second communications device 404 may be a Power Save (PS) Poll signal or a Scheduling Request (SR) signal.

Thus, the first communications device 402 may use dedicated signalling, e.g. dedicated UL signalling, such as the PS-Poll in Wi-Fi, or the SR in LTE, to indicate that the first communications device 402 is now awake and may be contacted by the second communications device 404.

Action 504

In some embodiments, the first communications device 402 receives, during the active mode period, a second data transmission, which second data transmission is transmitted from the second communications device 404.

The second data transmission may transmitted from the second communications device 404 to the first communications device 402 in response to the first data transmission or the another first data transmission transmitted from the first communications device 402 to the second communications device 404 as previously described in Action 501.

Figure 6:
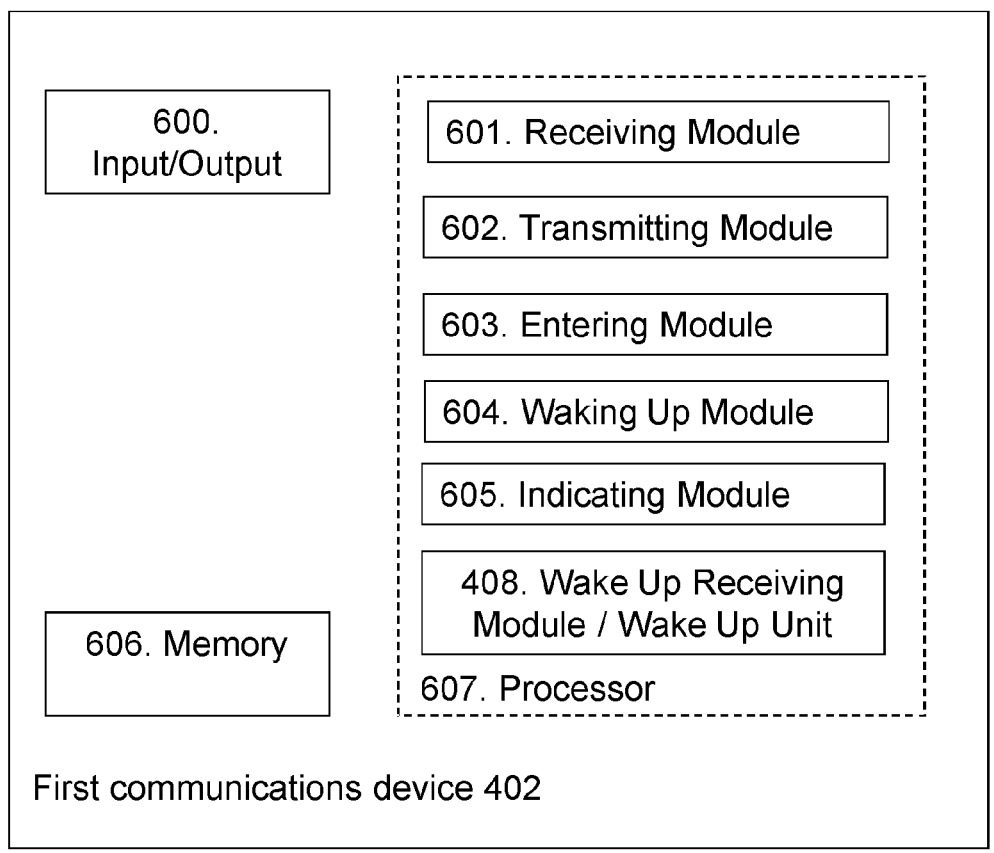
FIG. 6 is a schematic block diagram schematically illustrating embodiments of a first communications device.

To perform the method for handling of active mode operation in the wireless communications network 400, the first communications device 402 may be configured according to an arrangement depicted in FIG. 6. As previously mentioned, the first communications device 402 and the second communications device 404 are configured to operate in the wireless communications network 400.

The first communications device 402 comprises an input and output interface 600 configured to communicate, with one or more network nodes, e.g. with the second communications device 404 and a possible wake up receiving device 408 configured to operate in the wireless communications network 400. The input and output interface 600 may comprise a wireless receiver (not shown) and a wireless transmitter (not shown).

The first communications device 402 is configured to receive, e.g. by means of a receiving module 601 configured to receive, a transmission from one or more network nodes, e.g. from the second communications device 404 and the possible wake up receiving device 408. The receiving module 601 may be implemented by or arranged in communication with a processor 607 of the first communications device 402. The processor 607 will be described in more detail below.

The receiving module 601 is sometimes in this disclosure referred to as a main receiver or main receiving module. For example, this may be the case when the first communications device 402 comprises the wake up receiving module 408 in addition to the receiving module 601.

In some embodiments, the first communications device 402 is configured to receive, during the active mode period, a second data transmission, which second data transmission is transmitted from the second communications device 404. The second data transmission may be transmitted from the second communications device 404 in response to the first data transmission or another first data transmission transmitted from the first communications device 402 to the second communications device 404.

Further, the first communications device 402 may be configured to receive a configuration from the second communications device 404. As previously mentioned, the configuration may relate to the active mode operation and to active mode periods. For example, the configuration may relate to waking up to be responsive enough for certain expected traffic patterns, such as Transmission Control Protocol three way handshake. Thus, in some embodiments, the first communications device 402 is configured to be configured, e.g. pre-configured, by the second communications device 404.

The first communications device 402 is configured to transmit, e.g. by means of a transmitting module 602 configured to transmit, a transmission to the second communications device 404 and the possible wake up receiving device 408. The transmitting module 602 may be implemented by or arranged in communication with the processor 607 of the first communications device 402.

The first communications device 402 is configured to transmit a first data transmission to the second communications device 404.

In some embodiments, the first communications device 402 is configured to transmit the first data transmission to second communications device 404 by being configured to transmit the first data transmission using the MAC layer.

The first communications device 402 is configured to enter, e.g. by means of an entering module 603 configured to enter, a sleep mode. The entering module 603 may be implemented by or arranged in communication with the processor 607 of the first communications device 402.

The first communications device 402 is configured to enter the sleep mode.

In some embodiments, the first communications device 402 is configured to enter the sleep mode by further being configured to perform one or more out of:

enter the sleep mode until a second data transmission is to be transmitted to the second communications device 404, enter the sleep mode until a predetermined period of time has lapsed, and enter the sleep mode until reception of a wake up signal from the wake up receiving device 408.

The first communications device 402 is configured to temporarily wake up, e.g. by means of a waking up module 604 configured to temporarily wake up, from the sleep mode to an active mode. The waking up module 604 may be implemented by or arranged in communication with the processor 607 of the first communications device 402.

The first communications device 402 is configured to, at a number of points in time, temporarily wake up from the sleep mode to an active mode for a respective active mode period.

In some embodiments, a time period of the active mode period is variable between a minimum value and a maximum value. For example and as previously mentioned, the minimum value may be a few microseconds and the maximum value may be several hundreds of milliseconds. Thus, the length of one or more active mode periods may be varied and two active mode periods may not have to be of the same length in time.

Further, a time interval between the start of two consecutive active mode periods may be exponentially increased. For example and as previously described, assume that the first communications device 402 during one period of sleep mode temporarily wakes up ten times to an active mode for an active mode period. Then, the time interval between two consecutive active mode periods out of the ten active mode periods may increase exponentially from a first time interval between the first and second active mode periods to a ninth time interval between the ninth and tenth active mode periods.

The first communications device 402 is configured to indicate, e.g. by means of an indicating module 605 configured to indicate, a point of time of the active mode. The indicating module 605 may be implemented by or arranged in communication with the processor 607 of the first communications device 402.

The first communications device 402 is configured to indicate, to the second communications device 404, a point of time of the respective active mode period.

In some embodiments, the first communications device 402 is configured to indicate, to the second communications device 404, the point of time of the active mode period, by being configured to indicate the point of time of the active mode period when transmitting the first data transmission to the second communications device 404. As previously described, the indication of the point of time of the active mode period may comprise an expected point of time of the active mode period or a point of time indicated by a configuration. The latter point of time may be referred to a preconfigured point of time of the active mode period. The expected point of time may be a point of time expected by the first communications device 402. Further, it should be understood that the indication may comprise one or more indications of one or more active mode periods.

In some embodiments, the first communications device 402 is configured to indicate, to the second communications device 404, the point of time of the active mode period, by being configured to indicate the point of time of the active mode period after waking up from the sleep mode to the active mode.

The first communications device 402 may be configured to indicate the point of time of the active mode period by further being configured to transmit a signal to the second communications device 404 during the active mode period. The signal informs the second communications device 404 about the first communications device 402 being in the active mode.

In some embodiments, the signal transmitted to the second communications device 404 is a PS Poll signal or a SR signal.

The first communications device 402 may also comprise means for storing data. In some embodiments, the first communications device 402 comprises a memory 606 configured to store the data. The data may be processed or non-processed data and/or information relating thereto. The memory 606 may comprise one or more memory units. Further, the memory 606 may be a computer data storage or a semiconductor memory such as a computer memory, a read-only memory, a volatile memory or a non-volatile memory. The memory is arranged to be used to store obtained information, data, configurations, scheduling algorithms, and applications etc. to perform the methods herein when being executed in the first communications device 402.

Embodiments herein for handling of active mode operation may be implemented through one or more processors, such as the processor 607 in the arrangement depicted in FIG. 6, together with computer program code for performing the functions and/or method actions of embodiments herein. The program code mentioned above may also be provided as a computer program product, for instance in the form of a data carrier carrying computer program code for performing the embodiments herein when being loaded into the first communications device 402. One such carrier may be in the form of an electronic signal, an optical signal, a radio signal or a computer readable storage medium. The computer readable storage medium may be a CD ROM disc or a memory stick.

The computer program code may furthermore be provided as program code stored on a server and downloaded to the first communications device 402.

Those skilled in the art will also appreciate that the input/output interface 600, the receiving module 601, the transmitting module 602, the entering module 603, the waking up module 604, the indicating module 605, and the wake up receiving module 408 above may refer to a combination of analog and digital circuits, and/or one or more processors configured with software and/or firmware, e.g. stored in the memory 606, that when executed by the one or more processors such as the processors in the first communications device 402 perform as described above. One or more of these processors, as well as the other digital hardware, may be included in a single Application-Specific Integrated Circuitry (ASIC), or several processors and various digital hardware may be distributed among several separate components, whether individually packaged or assembled into a System-on-a-Chip (SoC).

Some Exemplifying Embodiments

In some exemplifying embodiments, the wireless communications network 400 is a low power Wi-Fi system according to IEEE802.11ah. Low power Wi-Fi is only used as an example here and it should be understood that the same concept applies just as well to, e.g., regular Wi-Fi, 3GPP LTE or BLE.

In some exemplifying embodiments, the first communications device 402 is a constrained device that send UL messages in an event driven manner and mainly sleeps otherwise. By the expression "constrained device" when used in this disclosure is meant a device that only has a small amount of memory, limited processing capabilities and is likely to run on a limited power source such as a AAA battery. Thus, the device may be configured for a maximal power saving. Furthermore, the exemplifying embodiments are not limited to a star topology wherein UL denotes the connection from an User Equipment (UE) or a station (STA) to an eNB or an Access Point (AP), rather the same UL and DL may also denote air interface links between a relay and another device, or any air interface links between, e.g., mesh nodes. For simplicity, the terms device and AP will be used in the following description for the first communications device 402 and the second communications device 404, respectively.

According some embodiments, the device, e.g. the first communications device 402, is configured to use an exponential sleep cycle after each UL transmission it performs on the MAC layer. It should be noted that if wanted, this behaviour may be configured only for data on specific bearers or queues, however, for simplicity, all transmissions will now be treated the same.

In some embodiments, an exponential backoff algorithm may be used to generate the wake-up instants, e.g. the one or more number of points in time when the first communications device 402 temporarily wakes up from the sleep mode to the active mode for a respective active mode period. However, other algorithms may also be used. In some embodiments, the wake-up period pattern may be adjusted based on the detected transport layer ACK feedback of the latest DL data burst for which the ACK feedback is available. For example, the period of time until a subsequent wake-up period may be doubled after a preceding wake-up period comprising a successful reception of an ACK. During an active period the first communications device 402 is available to receive DL data, e.g. relating to the second data transmission, if such is waiting in the other end of the link.

The maximum value until which the exponential cycles are continued may be chosen by the device, e.g. the first communications device 402. This value may be adapted as the device learns a pattern the communication seems to happen with. In some embodiments, such maximum value of the sleep cycle may be defined according to different priority classes of power saving for various devices. For example, a power-consumption sensitive device may have a relatively larger window for the sleeping cycle. As shown in Table 1 below, a look-up table may specifies the maximum and/or minimum sleeping cycle according to the priority class of various power-saving requirements. The device, e.g. the first communications device 402, may store the look-up table or may have access to a look-up table arranged external of the device. It should be noted that the table values are examples and may vary in different scenarios.

TABLE 1

An example look-up table for the sleeping cycle values vs. priority class

| Priority class | Minimum sleeping cycle | Maximum sleeping cycle |
| --- | --- | --- |
| 1 | 15 | 1023 |
| 2 | 15 | 511 |
| 3 | 15 | 255 |
| 4 | 15 | 127 |

When using the word "comprise" or "comprising" it shall be interpreted as non-limiting, i.e. meaning "consist at least of".

The embodiments herein are not limited to the above described preferred embodiments. Various alternatives, modifications and equivalents may be used. Therefore, the above embodiments should not be taken as limiting the scope of the invention, which is defined by the appending claims.

The invention claimed is:

1. A method performed by a first communications device for handling of active mode operation after transmitting data to a second communications device, wherein the first communications device and the second communications device are operating in a wireless communications network, and wherein the method comprises:
    transmitting a first data transmission to the second communications device;
    entering a sleep mode;
    temporarily waking up from the sleep mode at one or more different points in times to an active mode for a respective active mode period; and
    indicating, to the second communications device, a starting point of time of the respective active mode period and a starting point of an upcoming active mode period after waking up from the sleep mode to the active mode,
    wherein a time interval between two consecutive active mode periods is exponentially increased from a first time interval between first two consecutive active mode periods to a last time interval between last two consecutive active mode periods; and
    wherein the time interval between two consecutive active mode periods is reverted to the first time interval responsive to receiving an acknowledgement from the second communications device.

2. The method of claim 1, wherein the transmitting of the first data transmission to second communications device comprises:
    transmitting the first data transmission using a Medium Access Control, MAC, layer.

3. The method of claim 1, wherein the entering of the sleep mode further comprises one or more out of:
    entering the sleep mode until a second data transmission is to be transmitted to the second communications device,
    entering the sleep mode until a predetermined period of time has lapsed, and
    entering the sleep mode until reception of a wake up signal from a wake up receiving device.

4. The method of claim 1, wherein a time period of the active mode period is variable between a minimum value and a maximum value.

5. The method of claim 1,
    wherein a time interval between two consecutive active mode periods is varied by the first communications device, and
    wherein the indicating comprises indicating, to the second communications device, the starting point of time of the respective active mode period and the starting point of the upcoming active mode period which is determined by the first communication device based on an amount of the variation of the time interval between the respective active mode period and the upcoming active mode period.

6. The method of claim 5,
    wherein the time interval between two consecutive active mode periods is exponentially increased by the first communications device, and
    wherein the indicating comprises indicating, to the second communications device, the starting point of time of the respective active mode period and the starting point of the upcoming active mode period which is determined by the first communication device based on an amount of the exponential increase of the time interval between the respective active mode period and the upcoming active mode period.

7. The method of claim 1, wherein the indicating, to the second communications device, of the point of time of the active mode period, comprises:
    indicating the point of time of the active mode period when transmitting the first data transmission to the second communications device.

8. The method of claim 1, wherein the indicating, to the second communications device, of the point of time of the active mode period, comprises:
    indicating the point of time of the active mode period after waking up from the sleep mode to the active mode.

9. The method of claim 8, wherein the indicating of the point of time of the active mode period comprises:
    during the active mode period, transmitting a signal to the second communications device, which signal informs the second communications device about the first communications device being in the active mode.

10. The method of claim 9, wherein the signal transmitted to the second communications device is a Power Save, PS, Poll signal or a Scheduling Request, SR, signal.

11. The method of claim 1, further comprising:
    receiving, during the active mode period, a second data transmission, which second data transmission is transmitted from the second communications device.

12. The method of claim 1, further comprising:
    receiving a configuration from the second communications device.

13. A first communications device for handling of active mode operation after transmitting data to a second communications device, wherein the first communications device and the second communications device are configured to operate in a wireless communications network, and wherein the first communications device comprises:
    a processor; and
    memory including computer program code comprising instructions, such that when the processor executes the instructions, the processor is configured to,
    transmit a first data transmission to the second communications device;
    enter a sleep mode;
    temporarily wake up from the sleep mode at one or more different points in times to an active mode for a respective active mode period; and to
    indicate, to the second communications device, a starting point of time of the respective active mode period and a starting point of an upcoming active mode period after waking up from the sleep mode to the active mode,
    wherein a time interval between two consecutive active mode periods is exponentially increased from a first time interval between first two consecutive active mode periods to a last time interval between last two consecutive active mode periods; and
    wherein the time interval between two consecutive active mode periods is reverted to the first time interval responsive to receiving an acknowledgement from the second communications device.

14. The first communications device of claim 13, wherein the first communications device is configured to transmit the first data transmission to second communications device by the computer program code further comprising instructions that when executed by the processor cause the processor to,
    transmit the first data transmission using a Medium Access Control, MAC, layer.

15. The first communications device of claim 13, wherein the first communications device is configured to enter the sleep mode by the computer program code further comprising instructions that when executed by the processor cause the processor to,
    enter the sleep mode until a second data transmission is to be transmitted to the second communications device,
    enter the sleep mode until a predetermined period of time has lapsed, and
    enter the sleep mode until reception of a wake up signal from a wake up receiving device.

16. The first communications device of claim 13, wherein a time period of the active mode period is variable between a minimum value and a maximum value.

17. The first communication device of claim 13,
    wherein a time interval between two consecutive active mode periods is varied by the first communications device, and
    wherein the indicating comprises indicating, to the second communications device, the starting point of time of the respective active mode period and the starting point of the upcoming active mode period which is determined by the first communication device based on an amount of the variation of the time interval between the respective active mode period and the upcoming active mode period.

18. The first communications device of claim 17,
    wherein the time interval between two consecutive active mode periods is exponentially increased by the first communications device, and
    wherein the indicating comprises indicating, to the second communications device, the starting point of time of the respective active mode period and the starting point of the upcoming active mode period which is determined by the first communication device based on an amount of the exponential increase of the time interval between the respective active mode period and the upcoming active mode period.

19. The first communications device of claim 13, wherein the first communications device is configured to indicate, to the second communications device, the point of time of the active mode period, by the computer program code further comprising instructions that when executed by the processor cause the processor to,
    indicate the point of time of the active mode period when transmitting the first data transmission to the second communications device.

20. The first communications device of claim 13, wherein the first communications device is configured to indicate, to the second communications device, the point of time of the active mode period, by the computer program code further comprising instructions that when executed by the processor cause the processor to,
    indicate the point of time of the active mode period after waking up from the sleep mode to the active mode.

21. The first communications device of claim 20, wherein the first communications device is configured to indicate the point of time of the active mode period by the computer program code further comprising instructions that when executed by the processor cause the processor to,
    during the active mode period, transmit a signal to the second communications device, which signal informs the second communications device about the first communications device being in the active mode.

22. The first communications device of claim 21, wherein the signal transmitted to the second communications device is a Power Save, PS, Poll signal or a Scheduling Request, SR, signal.

* * * * *